Aug. 22, 1967 E. GRAEVE 3,337,813
PHASE-CONTROLLED OSCILLATOR HAVING A BISTABLE
CIRCUIT IN THE CONTROL LOOP
Filed Dec. 27, 1965

INVENTOR
E. GRAEVE
BY
[signature]
ATTORNEY

United States Patent Office 3,337,813
Patented Aug. 22, 1967

3,337,813

PHASE-CONTROLLED OSCILLATOR HAVING A BISTABLE CIRCUIT IN THE CONTROL LOOP

Egbert Graeve, Tinton Falls, N.J., assignor to Bell Telephone Laboratories, Incorporated, New York, N.Y., a corporation of New York Filed Dec. 27, 1965, Ser. No. 516,265
7 Claims. (Cl. 331—17)

ABSTRACT OF THE DISCLOSURE

A flip-flop is set or reset in accordance with the positive or negative sense of deviations from a predetermined frequency and phase relationship between an oscillator and a crystal reference, the output of the flip-flop through a lag filter network controlling the operation of the oscillator to establish and maintain the predetermined relationship.

Figure 1:
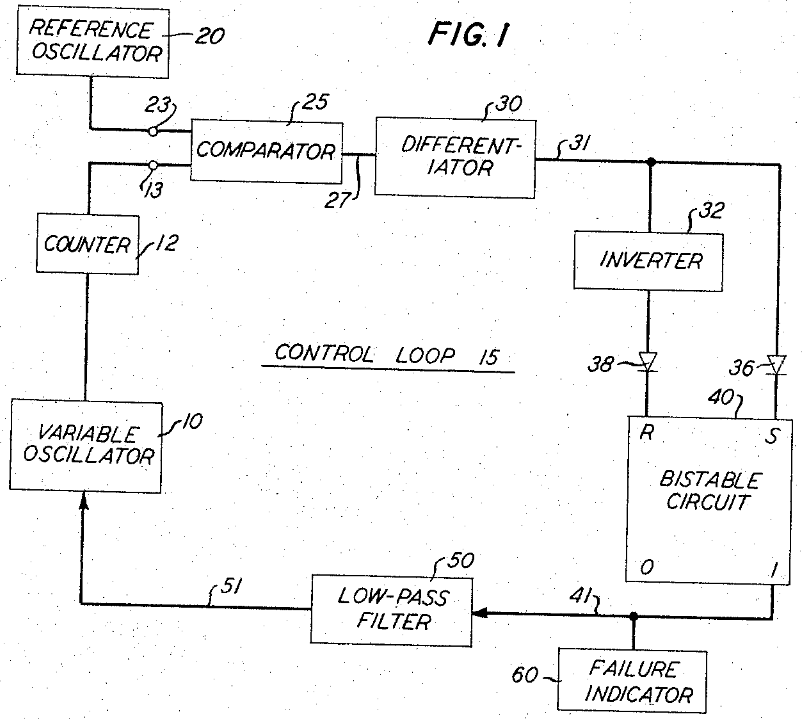

This invention relates to phase controlled oscillator arrangements. It has for a general object the provision of an improved arrangement for establishing and maintaining a predetermined frequency and phase relationship between two independent signal sources.

Many arrangements are known for comparing the frequencies of two signal sources and for establishing a predetermined relationship therebetween. Further, it is well known to compare the phase of two signal sources and to develop an error signal for controlling one of the signal sources in such a sense that a predetermined phase relationship is maintained. The former arrangements generally do not permit control of the phase relationship between the two signal sources, whereas known arrangements for performing the latter function often have a rather limited frequency deviation, or pull-in, range. Combinations of these arrangements, on the other hand, though performing satisfactorily, tend to be somewhat complex and expensive.

Accordingly, a more particular object of this invention is to provide a simple, economical and reliable arrangement operative over a relatively wide pull-in range for establishing and maintaining a predetermined frequency and phase relationship between two signal sources.

A further object of this invention is to provide a simple, economical and reliable phase controlled oscillator arrangement which may be monitored readily to provide an indication in the event of failure.

In accordance with the invention, the above and other objects are attained in an illustrative embodiment of a phase controlled oscillator arrangement employing only the sense or direction of deviations from a desired frequency and phase relationship between the controlled oscillator and a reference source. The sense of such deviations is used to switch a bistable circuit into a corresponding one of its two stable states. A deviation in one direction switches the bistable circuit into one state and a deviation in the other direction switches the bistable circuit into its other state. Switching of the bistable circuit between its two stable states in this manner generates an output signal for controlling the oscillator so as to bring it into the desired predetermined relationship with the reference source. The output signal from the bistable circuit is proportional to the duty cycle of the bistable circuit and thus to the deviation from the desired frequency and phase relationship between the reference source and the controlled oscillator.

An aspect of the present invention relates to the advantageous utilization thereof in controlling a frequency modulated oscillator to phase lock the average frequency thereof to a reference source without attenuating or interfering with the modulation signal. In C. F. Ault patent application Ser. No. 409,836, filed Nov. 9, 1964, for example, an arrangement is disclosed for reducing interference caused by electromagnetic radiation from clock controlled systems by modulating the clock oscillator frequency with a random frequency signal. Since the clock is the timing source for the system, however, the average frequency thereof must be maintained at crystal accuracy. Known phase locking arrangements were found to be generally unsatisfactory for this purpose.

A feature of this invention, therefore, relates to the establishment and maintenance of a predetermined frequency and phase relationship between two signal sources through an arrangement including a bistable circuit responsive only to the sense or direction of deviations from the predetermined relationship.

A further feature of this invention relates to a phase controlled oscillator arrangement including a bistable circuit selectively switchable into its respective stable states in accordance with the sense of differences between the frequency and phase of the oscillator and a reference for generating a signal proportional to the duty cycle of the bistable circuit for controlling the oscillator in such manner as to establish and maintain a fixed phase relationship with the reference.

Another feature of this invention relates to circuitry in such an arrangement for monitoring the switching activity of the bistable circuit to provide an indication in the event of failure of the arrangement.

The above and other objects and features of the invention may be fully comprehended from the following detailed description when considered with reference to the accompanying drawing in which:

FIG. 1 is a block diagram of an illustrative embodiment of a phase controlled oscillator arrangement in accordance with the principles of the invention; and FIGS. 2A through 2D depict various waveforms useful in describing the operation of the embodiment of FIG. 1.

In FIG. 1 of the drawing, an illustrative embodiment of a phase controlled oscillator arrangement is shown for controlling the frequency and phase of a first signal source, oscillator 10, via control loop 15 to maintain a predetermined relationship with the frequency and phase of a second source, reference oscillator 20. The outputs of variable oscillator 10 and reference oscillator 20 are connected to respective input terminals 13 and 23 of comparator 25. Counter 12 may be connected between variable oscillator 10 and comparator input terminal 13, as shown in the drawing, to permit use of a reference oscillator 20 having an output frequency which is a submultiple of the desired output frequency of variable oscillator 10. Variable oscillator 10 may comprise any known oscillator having, by way of example, a nominal output frequency of two megacycles per second, variable within a fixed frequency range as a function of a control signal on lead 51, and reference oscillator 20 may comprise a crystal oscillator operating at 181.8 kilocycles per second, counter 12 providing an 11-to-1 countdown of oscillator 10.

Comparator 25 generates an output signal on lead 27, which is a predetermined function of the phase difference between the signals applied to input terminals 13 and 23. Advantageously, comparator 25 may have a sawtooth output characteristic which is a function of the frequency and phase difference between the two input signals, of the type described, for example, in volume 41 of the Bell System Technical Journal at pages 559 through 602. It will be appreciated from the description herein, however, that any known arrangement may be employed in comparator 25 which provides a signal on lead 27 indicative of the sense of the frequency difference between the signals applied to input terminals 13 and 23.

The output signal of comparator 25 on lead 27 is applied to set input S or to reset input R of bistable circuit 40 according to whether the sense of the frequency difference between the two input signals is positive or negative. In the illustrative embodiment of FIG. 1, assuming a sawtooth output characteristic for comparator 25, the output signal on lead 27 is differentiated by differentiator 30 and directed over lead 31 toward set input S of bistable circuit 40 through diode 36. The inverted output of differentiator 30, via inverter 32, is directed toward reset input R of bistable circuit 40 through diode 38. Diodes 36 and 38 are poled in the same direction. Therefore, one sense of frequency difference between the two input signals at input terminals 13 and 23 will cause bistable circuit 40 to be set in one of its two stable states via set input S, and the opposite sense of frequency difference will cause bistable circuit 40 to be reset in the other of its stable states via reset input R.

An output of bistable circuit 40 on lead 41 is connected through low-pass filter 50, which may be a simple RC phase lag filter, over lead 51 to variable oscillator 10. The bistable circuit output signal on lead 41 is a square wave signal generated by the switching of bistable circuit 40 between its two stable states, that is, between its set and reset states. The resulting signal on lead 51 through filter 50 is a control signal whose direct current value is proportional to the duty cycle of bistable circuit 40. The switching rate of bistable circuit 40 is determined by the delays and time constants of the circuitry in control loop 15.

For the purposes of describing the operation of the illustrative embodiment of FIG. 1, assume that initially at time $t_0$ in FIGS. 2A through 2D the desired predetermined relationship between variable oscillator 10 and reference oscillator 20 does not exist. Assume, by way of example, that variable oscillator 10 is operating at a frequency which is less than the desired frequency thereof relative to the frequency of reference oscillator 20. Thus the frequency of the input signals applied to input terminal 13 of comparator 25 will be correspondingly slower than the frequency of the input signals applied to comparator input terminal 23. Responsive thereto, comparator 25 generates an output signal on lead 27 representative of the sense of the frequency difference between the two input signals, indicating that the input signal at terminal 13 is slower in frequency than the input signal at terminal 23.

Figures 2A, 2B, 2C, 2D:
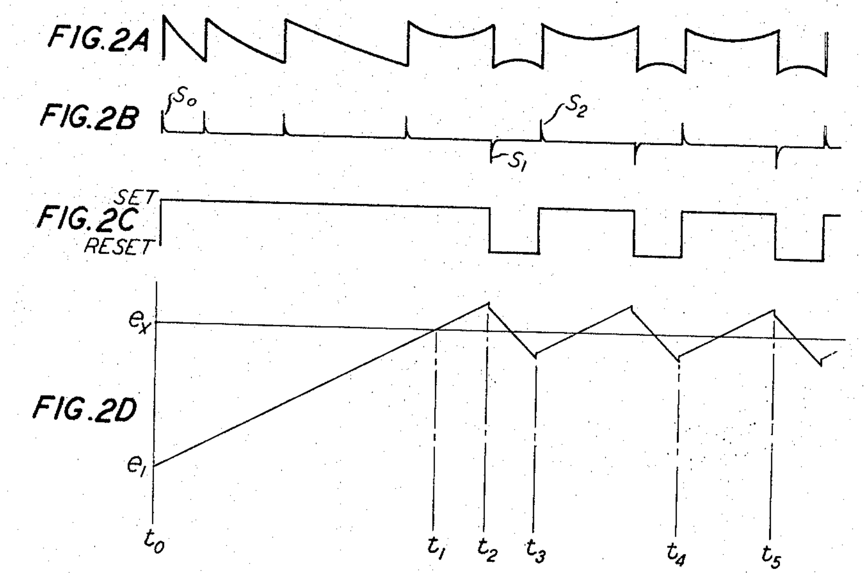

In FIG. 2A an illustrative comparator output signal is depicted, as would appear on lead 27 for a comparator having a sawtooth output characteristic. The manner in which this sawtooth comparator output characteristic is generated is described, for example, in the above-mentioned Bell System Technical Journal article. The direction or sense of the fast transitions in the sawtooth characteristic corresponds to the sense of the frequency difference between the input signals applied to input terminals 13 and 23. As shown, a positive-going fast transition in the comparator output signal on lead 27, such as at time $t_0$, represents a slower frequency input signal applied to terminal 13 than to terminal 23. Conversely, a negative-going fast transition appearing in the comparator output signal on lead 27 represents a greater frequency input signal applied to terminal 13 than to terminal 23.

The comparator output signal on lead 27 is differentiated by differentiator 30 to produce a signal on lead 31, as depicted in FIG. 2B of the drawing, in a form suitable for triggering bistable circuit 40. Inasmuch as the frequency of the input signal at terminal 13 is assumed to be slower initially than the signal at terminal 23, the signal $s_0$ produced on lead 31 at time $t_0$ is positive-going and is directed through diode 36 to set input S of bistable circuit 40. Thus bistable circuit 40 is set by signal $s_0$ on lead 31, the set state of bistable circuit 40 indicating in the illustrative embodiment herein that the frequency of variable oscillator 10 is slower than the desired frequency thereof relative to the frequency of reference oscillator 20. The state of bistable circuit 40 and the corresponding output signal produced thereby on lead 41 is shown in FIG. 2C of the drawing.

The control signal on lead 51 is generated from the bistable circuit output signal, the direct current level of the control signal varying the frequency of variable oscillator 10 in such a way as to achieve and maintain the desired relationship with the frequency and phase of reference oscillator 20. In the illustrative embodiment described herein, it is assumed that increasing the control signal level on lead 51 increases the frequency of variable oscillator 10 and, conversely, that decreasing the control signal level on lead 51 decreases the frequency of variable oscillator 10. Accordingly, the set output of bistable circuit 40 increases the control signal level on lead 51 from its initial level $e_i$ at time $t_0$ as depicted in FIG. 2D of the drawing, the control signal level being registered, for example, on a filter capacitor (not shown) in low-pass filter 50.

The control signal level on lead 51 continues to increase toward some maximum level so long as bistable circuit 40 remains in its set state. The frequency of variable oscillator 10 is increased thereby in a corresponding manner toward the upper end of its variable frequency range. At some intermediate control signal level, such as at level $e_x$ in FIG. 2D, the frequency and phase of variable oscillator 10 achieve the desired relationship with the frequency and phase of reference oscillator 20. This is shown as occurring at time $t_1$ in FIG. 2D.

However, the control signal level on lead 51 continues to increase, tending to increase the frequency of variable oscillator 10 until comparator 25 recognizes that the frequency of variable oscillator 10 has increased beyond the desired value thereof. Thereupon, comparator 25 provides an output signal through differentiator 30 to reset bistable circuit 40, indicated as occurring at time $t_2$ in the drawing. Thus, signal $s_1$ produced on lead 31 at time $t_2$ resets bistable circuit 40, the reset output thereof on lead 41 decreasing the signal level of the control signal appearing on lead 51, thereby tending to decrease the frequency of variable oscillator 10. A number of signals of the same sense as signal $s_0$ may be generated intermediate signals $s_0$ and $s_1$, as indicated in the drawing, depending upon the particular comparator circuitry employed. However, these signals have no effect on the operation of the present invention since bistable circuit 40 is set by signal $s_0$ and remains set until it is reset by signal $s_1$.

As the control signal level on lead 51 decreases below level $e_x$, comparator 25 responds to the resulting departure of variable oscillator 10 from the desired relationship with reference oscillator 20, generating signal $s_2$ on lead 31 at time $t_3$ to again set bistable circuit 40. Consequently, the control signal level on lead 51 starts to increase again to bring variable oscillator 10 back into the desired relationship with reference oscillator 20.

Once the desired frequency and phase relationship is achieved between variable oscillator 10 and reference oscillator 20 in the manner just described, the relationship is maintained by control loop 15 in a similar manner through the appropriate switching of bistable circuit 40 responsive to the sense of departures from the desired relationship. Comparator 25 responds to a departure in one direction from the desired relationship to set bistable circuit 40, as at time $t_4$ in FIG. 2, and to a departure in the other direction to reset bistable circuit 40, as at time $t_5$ in FIG. 2. The resulting bistable circuit output on lead 41, and thus the control signal level on lead 51, is a function of the duty cycle of bistable circuit 40, that is, of the ratio between the period of time bistable circuit 40 is in the set state and the period of time it is in the reset state. The switching rate of bistable circuit 40 is determined by the delays and time constants of the circuitry in control loop 15 and may be, for example, on the order of 500 cycles per second.

What is disclosed hereinabove, therefore, is an arrangement for controlling a first oscillator to maintain a desired frequency and phase relationship with a second oscillator over a wide pull-in range by employing only the sense or direction of departures from the desired relationship. The above arrangement has been found to be particularly useful for locking the average frequency of a frequency modulated oscillator to a reference without attenuating or interfering with the modulation signal. Morevover, it will be appreciated that, in accordance with another aspect of the invention, the above-described arrangement permits failure thereof to be readily detected by simply monitoring the switching activity of bistable circuit 40, absence of such activity indicating a failure. Failure indicator 60 connected to bistable circuit output lead 41 for this purpose may comprise, for example, a simple timer circuit that is set by each setting of bistable circuit 40. After a predetermined timing interval indicator 60 times out to provide a failure indication unless, as would occur in normal operation of control loop 15, bistable circuit 40 is reset and set again prior to the expiration of the timing interval.

It is to be understood that the above-described arrangements are merely illustrative of the application of the principles of the present invention. Numerous other arrangements may be devised by those skilled in the art without departing from the spirit and scope of the invention.

What is claimed is:

1. In combination, a first signal source, a second signal source and means for establishing and maintaining a predetermined frequency and phase relationship between the signal outputs of said first and second signal source comprising a bistable circuit, means for deriving a signal representative of the sense of deviations from said predetermined relationship, means including said bistable circuit responsive to said signal representative of the sense of deviations from said predetermined relationship for controlling the operation of at least one of said first and second signal sources.

2. In combination; a first signal source; a second signal source; and means for establishing and maintaining a predetermined frequency and phase relationship between the signal outputs of said first and second signal sources comprising means responsive to the sense of deviations from said predetermined relationship for controlling the operation of at least one of said first and second signal sources; said controlling means comprising a bistable circuit, means for continuously comparing the phase of the output of said first signal source with the phase of the output of said second signal source to derive a signal representative of the sense of deviations from said predetermined relationship between the outputs of said first and second signal sources, and means responsive to said signal for enabling the selective switching of said bistable circuit to one or the other of its respective stable states in accordance with the sense of the said deviations.

3. The combination in accordance with claim 2 wherein said comparing means comprises means for deriving a first signal representative of a first sense of deviation from said predetermined relationship between the outputs of said first and second signal sources and for deriving a second signal representative of a second sense deviation from said predetermined relationship between the outputs of said first and second signal sources, and wherein said selective enabling means comprises means for enabling said first signal to switch said bistable circuit to one of its stable states and for enabling said second signal to switch said bistable circuit to the other of its stable states.

4. The combination in accordance with claim 2 further comprising means including a filter connecting an output of said bistable circuit to at least one of said first and second signal sources for controlling the operation thereof in accordance with said bistable circuit output.

5. The combination in accordance with claim 1 wherein said first signal source comprises an oscillator variable over a fixed frequency range in accordance with the magnitude of a control signal applied thereto, wherein said second signal source comprises a reference oscillator, and wherein said controlling means further comprises means responsive to said signal for placing said bistable circuit in one or the other of its stable states, respectively, in accordance with the positive or negative sense of said deviations, the output of said bistable circuit providing said control signal.

6. The combination in accordance with claim 5 further comprising filter means connected to the output of said bistable circuit and including means for registering a control signal magnitude proportional to the duty cycle of said bistable circuit, and means connecting said registering means to said variable oscillator.

7. In combination; a first signal source; a second signal source; and means for establishing and maintaining a predetermined frequency and phase relationship between the signal outputs of said first and second signal sources comprising means responsive to the sense of deviations from said predetermined relationship for controlling the operation of at least one of said first and second signal sources; said controlling means comprising a bistable circuit, means for continuously comparing the phase of the output of said first signal source with the phase of the output of said second signal source to derive a signal representative of the sense of deviations from said predetermined relationship between the outputs of said first and second signal sources, means responsive to said signal for enabling the selective switching of said bistable circuit to one or the other of its respective stable states in accordance with the sense of said deviations, and means connecting the output of said bistable circuit to one of said first and second signal sources for varying the frequency thereof to establish and maintain said predetermined relationship with the frequency and phase of the other of said first and second signal sources.

References Cited

UNITED STATES PATENTS

| | | | |
|---|---|---|---|
| 2,924,783 | 2/1960 | Shapiro et al. | 331—18 X |
| 3,259,851 | 7/1966 | Brauer | 331—18 X |

ROY LAKE, *Primary Examiner.*

S. H. GRIMM, *Assistant Examiner.*